United States Patent [19]

Spooner

[11] 4,048,653
[45] Sept. 13, 1977

[54] VISUAL DISPLAY APPARATUS

[75] Inventor: Archer Michael Spooner, South Nutfield, England

[73] Assignee: Redifon Limited, England

[21] Appl. No.: 622,717

[22] Filed: Oct. 15, 1975

[30] Foreign Application Priority Data

Oct. 16, 1974 United Kingdom ............... 44837/74

[51] Int. Cl.² ............................................. 7/18; 5/72
[52] U.S. Cl. ..................................... 358/104; 358/250
[58] Field of Search ............................... 358/104, 250

[56] References Cited
U.S. PATENT DOCUMENTS

| 3,076,271 | 2/1963 | Marvin | 35/12 |
| 3,401,233 | 9/1968 | Hellings | 358/104 |
| 3,614,314 | 10/1971 | Rossire | 358/250 |
| 3,757,190 | 9/1973 | Shelley | 318/625 |

Primary Examiner—Howard W. Britton

Attorney, Agent, or Firm—Larson, Taylor and Hinds

[57] ABSTRACT

Head-coupled visual display apparatus for a sole observer, particularly in craft flight simulation apparatus, for providing to a pilot a view simulating that seen from an actual craft. The apparatus includes an image generator of known type, such as closed circuit television or computer generated image types, an image projector, a helmet with a binocular viewer attached and a movable optical path linking the image projector with the helmet viewer. The helmet binocular viewer comprises a beamsplitter, which splits the image beam into left-eye and right-eye beams, and left-eye and right-eye mirrors, which reflect the corresponding image beams onto a retro-reflective screen, and which permit the pilot to view the cockpit and the reflected image therethrough. Sensing means detect head movements of the pilot and the generated image is changed correspondingly, to permit voluntary scanning of a wide angle field of simulated view.

8 Claims, 4 Drawing Figures

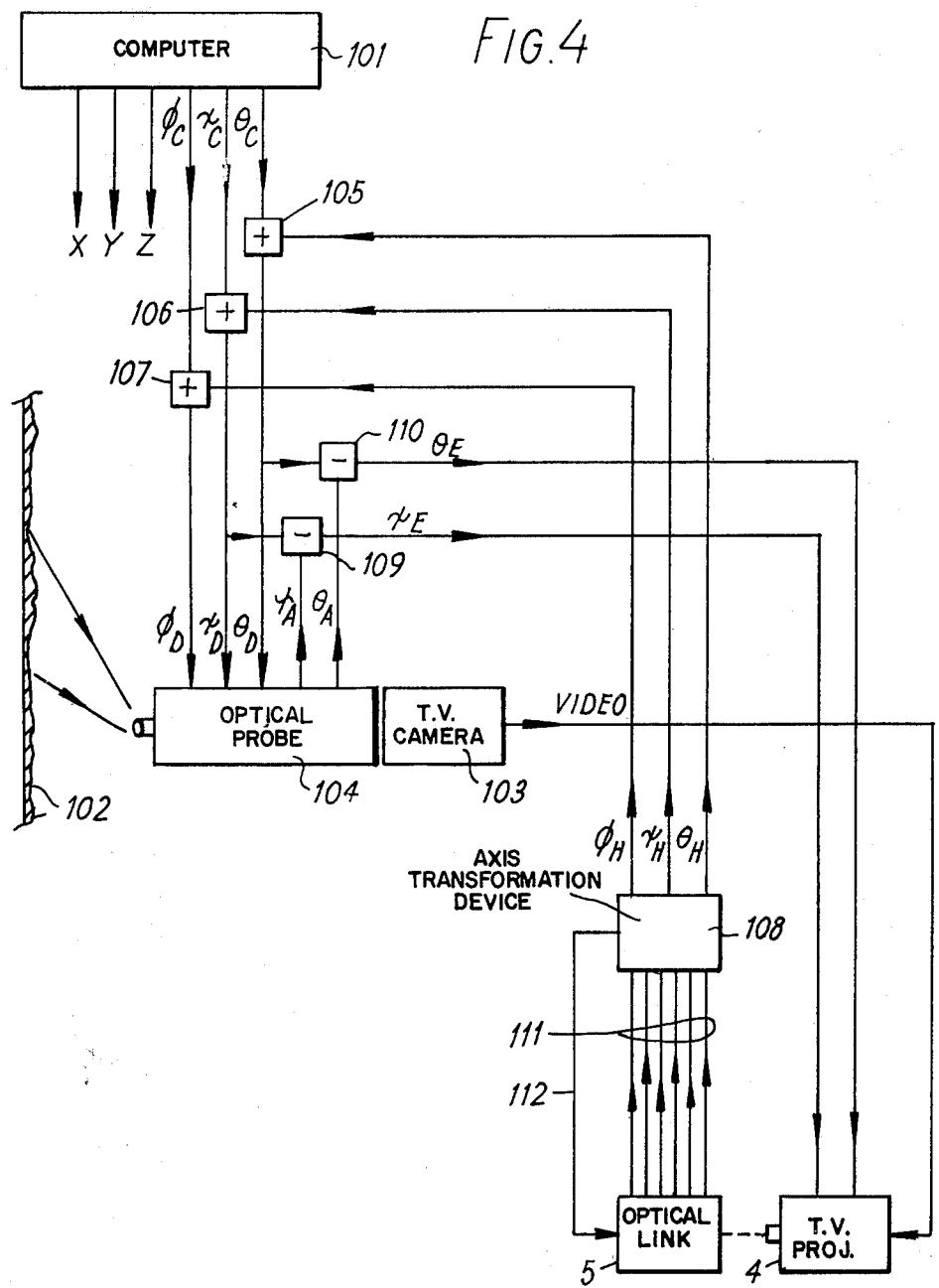

VISUAL DISPLAY APPARATUS

This invention relates to visual display apparatus and particularly to apparatus for providing a wide angle visual display to an observer, for example the view seen from an aircraft or other craft.

Such visual displays are commonly provided for the trainee pilot in aircraft and other craft flight simulation apparatus. Most commonly at present, the view is provided by an optical probe which moves over and views a scale model, simulating the attitude and motion of the simulated craft in flight.

Most such visual displays for flight simulation apparatus cover a portion only of the total field of view available to the pilot in the actual craft. For an aircraft flight simulator the display might be 50° wide by 40° high, whereas the total horizontal field of view (FOV) in an aircraft can be in excess of 180° and the vertical FOV 60° or more. Larger fields of view are available in helicopters and in combat aircraft.

The display for the trainee pilot usually takes the form of a closed circuit television (CCTV) image which is presented directly on a cathode ray tube or by projection on a screen. Optical arrangements are usually provided such that the image is collimated, that is it appears to the trainee pilot to be in the far distance.

The resolution of the displayed image is severely limited by the resolution of available CCTV systems, but it is sufficient for many training purposes, as long as the FOV is restricted to about 50° × 40°. If a much larger FOV is required, for example, for military simulation, the resolution must be reduced in inverse proportion as the FOV is increased. The resultant image is then not acceptable for practical training purposes.

The object of the present invention is to provide improved visual display apparatus.

More particularly, the invention seeks to provide the display advantages of an unrestricted FOV, using available CCTV systems and without the necessity for reduction in image resolution. The invention makes use of a 'center-of interest' principle. That is, the instantaneous FOV displayed to the trainee pilot is restricted to an instantaneous field of say 40° diagonal, but this field can be moved about freely within a larger FOV, which would be available to the pilot in an aircraft, according to the direction in which the trainee pilot looks.

Further, the invention seeks to avoid the use of large curved screens or of other optical components which are usually associated with known wide-angle visual displays. Such screens, when used, occupy a volume of space such that the complete simulator cockpit with all the component parts of the visual display cannot be mounted on a normal motion system, such as is commonly used to simulate actual aircraft movements.

Accordingly, the present invention provides visual display apparatus for providing a visual display before a trainee pilot of a moving craft or like observer, comprising image generating apparatus and image projection apparatus for projecting an image generated by the image generating apparatus, the projection apparatus including a projection screen of highly retroflective material at least partly surrounding the pilot, a helmet or the like, to be worn on the pilot's head, an optical projector for projecting the said image as a light beam and movable optical means defining a movable optical path for the said light beam between the optical projector and the pilot's helmet, light reflective means, carried by the said helmet, for reflecting said image light beam forwardly onto the said projection screen from a position corresponding to the pilot's eyes, means for varying said generated image in accordance with the movement and attitude of the said craft, means for sensing movement in rotation and in inclination of the said helmet and providing control signals corresponding thereto and means, responsive to said control signals, for varying said generated image correspondingly to the orientation of said pilot's helmet.

Preferably, in order to provide the illusion that the displayed image is at infinity, the said movable optical path includes light beam splitting means for splitting said image light beam into left eye and right eye image beams and said light reflective means carried by the helmet reflects both said image beams forwardly from positions corresponding to the pilot's left eye and right eye, respectively.

In such case, it is preferred for the left and right eye image beam paths to include light-polarizing means to polarize the two light beams in directions at right-angles.

Conveniently, the image projection apparatus includes a television image projection tube and the image generating apparatus includes a scale model at least of terrain overflown, by said craft, an optical probe including a lens for viewing the model and for providing an image for a closed-circuit television camera tube, means for moving the probe correspondingly to simulated craft movement, means for directing the viewing lens axis according to craft attitude and means for further directing the viewing lens axis responsive to the said control signals.

In a preferred form of the invention, for an aircraft flight simulator, the pilot has, attached to the front of his helmet, a beam splitter through which he views the interior of the cockpit and a simulated scene through the cockpit windows. This scene is reproduced as a television image, which may preferably be in color, in a television projector whose output light beam is directed, through a flexible optical link, to the head of the pilot, where the output beam is split into left and right beams which are directed downward onto the beam splitter. The arrangement of the beam splitter is such that the two beams are reflected forward of the pilot from points in space coinciding with the two eyes of the pilot.

A screen or screens of highly retro-reflective material, such as 'Scotchlite' (Registered Trade Mark) material, is placed outside the cockpit windows. The position and shape of the screens is not critical as long as screen material is visible through the whole area of each window. The two beams produce two focused images on the 'Scotchlite' (RTM) material, separated by about 2½ inches, the eye separation. Scotchlite material reflects incident light back along the same path in a highly directional manner, so that most of the light forming each image described is returned to the corresponding eye of the pilot. Because the light retraces its path, there is no geometrical error due to the screen.

The pilot sees, with each eye, a bright image, due to the very high reflection factor of the screen material and a polarizing technique is used to ensure that the left eye image is seen only by the left eye, and similarly the right eye image is seen only by the right eye.

Some areas of the image projected forwards from the beam splitter will necessarily fall outside the area of the cockpit windows and will fall on the inside of the cockpit, instrument panel and so on. However, after reflection back into the pilot's eyes, the light level is so low compared with the light level reflected from the screen material that such part of the projected image cannot be seen. Light passing downward through the beam splitter can also be ignored. Normal cockpit illumination on the instruments can be used without affecting the clarity of the view seen through the cockpit windows.

Because the two images on the screen are separated by the eye separation distance, the lines of sight of the two eyes are parallel and the so-called 'retinal disparity' of the two images in the eyes corresponds to that of infinitely distant objects. The view seen by the pilot through the cockpit windows appears therefore to be in the far distance. The eyes are, of course, focused on the screen, which may only be say 5 feet away from the eyes instead of at infinity. However, the brain is relatively insensitive to eye-focus as a cue to the distance of objects seen and the illusion provided is unimpared. Although such use of the eyes, diverged to infinity but focused at some nearer distance, does not occur in normal life, it is well-known that optical instruments, such as binocular microscopes, can be used satisfactorily in this way without producing eyestrain.

As described so far, the system would give a simulated view through the cockpit windows within a FOV of about 40° diagonal, from a fixed head position. To enable the pilot to look in any direction and to see before him, through the appropriate cockpit window areas, the corresponding simulated view, angular sensors are used on the joints in the flexible optical link connecting the projector to the beam splitter on the pilot's helmet. The signals from these sensors are used to control the image generating equipment so that, whichever way the pilot looks, the correct view is obtained. Correct parallax between window bars and distant scene is achieved, as for an infinitely distant scene.

In order that the invention may be readily carried into practice, one embodiment thereof will now be described in detail, by way of example, with reference to the accompanying drawings, in which:

FIG. 4 is a schematic diagram showing the operation of angular sensors of the flexible optical link in relation to image generating apparatus.

Figure 1:
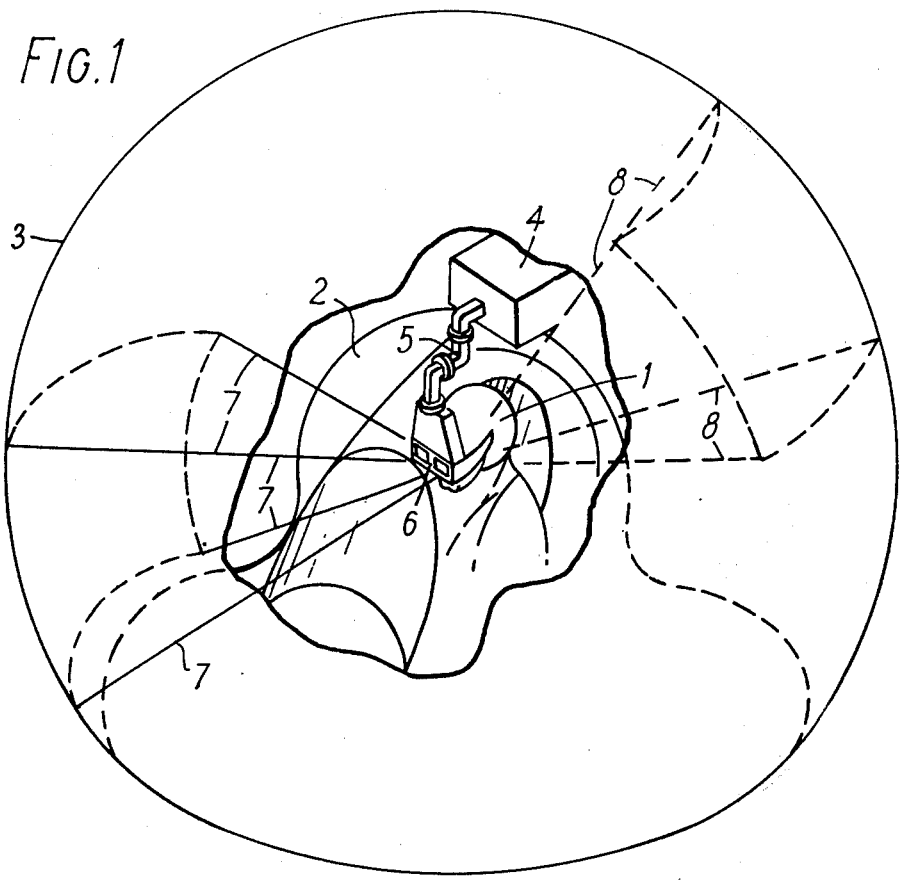
FIG. 1 is a diagrammatic perspective view showing the cockpit area and external projection screen of flight simulation apparatus.

FIG. 1 shows the principle of operation of the image projection and image viewing part of apparatus according to the invention. As shown in FIG. 1, a pilot wearing a helmet 1, is shown seated in a cockpit 2, surrounded by a screen 3, of Scotchlite (RTM) material. A television projector 4 is connected by a flexible optical link 5 to a beam splitter 6. Light rays 7 fall on the screen 3 to form two superimposed images and are reflected back along the same paths to the eyes of the pilot.

Dotted rays 8 shown an alternative position of the images on the screen 3 corresponding to an alternative position of the pilot's head, and it can be seen that, as long as the screen encloses the pilot sufficiently, he can obtain a view in any direction in which he can turn his head.

Figure 2:
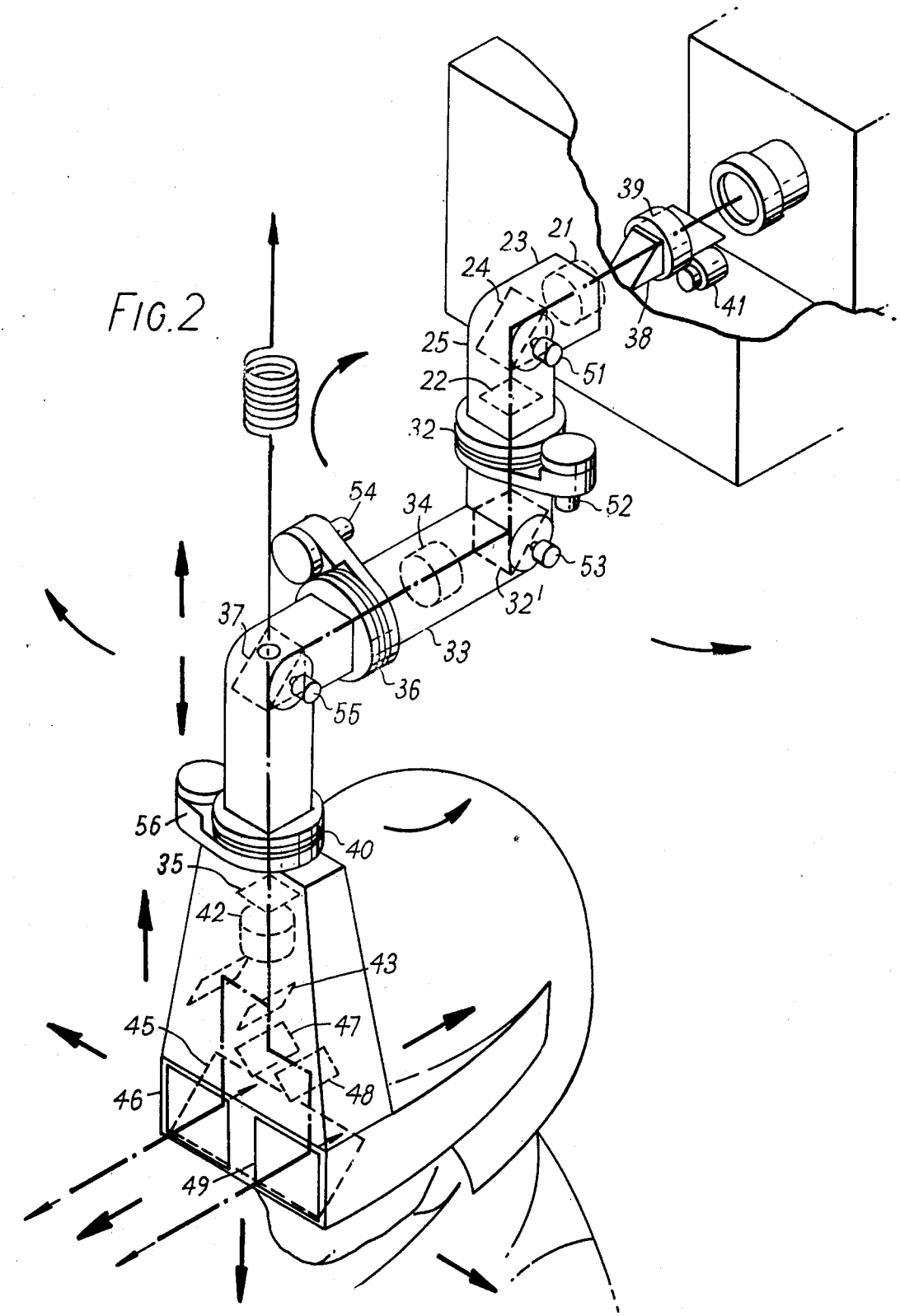
FIG. 2 is a perspective diagram showing optical projection apparatus and a flexible optical link between the projector and a beam splitter attached to a pilot's helmet.

FIG. 2 shows the apparatus of FIG. 1 in more detail. The light beam from the TV projector 4 is collimated, that is is focused to infinity, and is then passed through a Dove prism 38, which is mounted on bearings 39, and rotated axially by servo motor 41. The purpose of the Dove prism 38 is to compensate for unwanted rotations of the displayed image caused by the head movements of the pilot. The light beam then passes through an input lens 21, which forms a real image a short distance away at 22. The beam leaving the lens passes through a fixed tube 23 and then falls on a prism 24, which deflects the beam along the axis of a light tight tube 25, which is pivoted with respect to the fixed tube 23.

Figure 3:
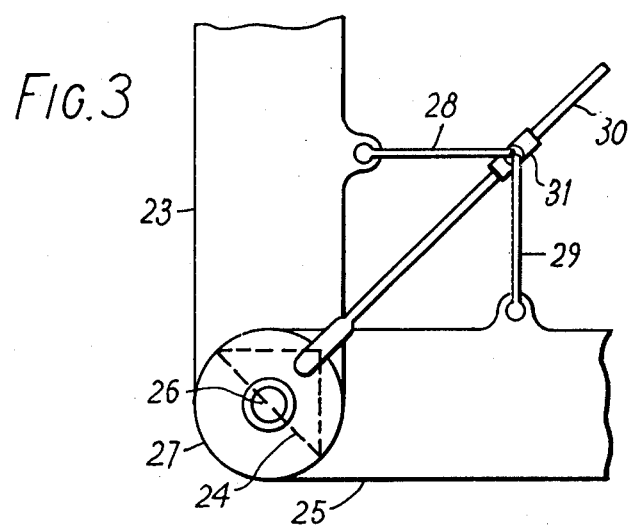
FIG. 3 is a diagram showing details of a rotatable joint of the flexible optical link.

Referring to FIG. 3, the tube 25 can move freely about a bearing 26 and the prism 24, mounted on a rotating table 27, can also rotate about the bearing 26. The angular rotation of the prism 24 is arranged to be always exactly half the angular rotation of the tube 25. This is effected by a mechanism consisting of pivoted links 28 and 29, which effectively bisect the angle between the two tubes, and a rod 30, which slides in a sleeve bearing 31 attached to the junction of the links 28 and 29 and is attached at its other end to the rotating table 27.

Referring again to FIG. 2, part way along the tube 25 is a rotating joint 32, which allows one end of the tube 25 to turn axially with respect to the other end. At the lower end of the tube 25 is another pivoting joint having a prism 32' and other parts identical to those associated with prism 24.

Light leaving prism 32' enters a second light tight tube 33 and passes through a relay objective 34, which focuses the image plane 22 onto an image plane 35, further along the optical system, thus ensuring that virtually all the light, except for transmission losses, entering the tube 23, is transmitted through the optical system.

Part way along tube 33 is another rotating joint 36 and, at its left hand end, is another pivoting joint having a prism 37 and other parts identical to those associated with prisms 24 and 32'.

The light leaving the prism 37 passes through a rotating joint 40, and next enters an eyepiece 42, which is focussed on the image plane 35 and gives an output beam which diverges to cover an angle of about 40° and which is focused on the screen 3, see FIG. 1, by way of additional optical elements, as follows: the beam leaving eyepiece 42 falls on an auxiliary beam splitter 43, which divides the beam into two beams, one of which is reflected and the other transmitted. The reflected beam is directed downwards by a mirror 44 and falls on the main beam splitter 45, which is set at approximately 45° to the vertical and through which the pilot views the screen 3.

The beam falling on beam splitter 45 is reflected forwardly through a sheet of plane polarizing material 46 and forms the right eye image on screen 3. The beam transmitted by auxiliary beam splitter 43 is reflected by mirrors 47 and 48 down onto the beam splitter 45, where it is reflected forwardly through a sheet of plane polarizing material 49, to form the left eye image on the screen 3.

Since the whole field of view of the left eye is through the polarising sheet 49 and, since the left eye beam is also passed through sheet 49, only the left eye image on the screen 3 is visible to the pilot's left eye. The polarizing sheet 46 is rotated 90° with respect to the sheet 49 and so, although the right eye can see the right eye image, no light from the left eye image can be seen by the right eye, and vice versa, because the reflected light from the screen 3 maintains the direction of polarization of the incident light. Some polarization occurs at the beam splitter 43 and the orientation of sheets 46 and 49 is chosen to maximise the rejection of the unwanted image at each eye.

The whole flexible optical structure is counterbalanced by a spring 50, so that the weight does not rest on the pilot's head. Arrangements, not shown, are made to fold the structure back, so that the pilot can enter his seat before swivelling the structure forward and attaching it to his helmet.

At each joint of the flexible optical structure, a potentiometer is mounted on the shaft and, by being fed with a D.C. voltage, provides an output signal voltage proportional to the angular rotation of the joint. The potentiometers are shown at 51, 52, 53, 54, 55 and 56, FIG. 2. From these output readings, it is required to compute the attitude of the pilot's head, so that image generation equipment provided may be controlled to give the appropriate view for that head position. It should be noted that translational components of head movement, that is, side-to-side, up-and-down, and forward-and-back movements, must not change the view, as a view at infinity does not change with change of viewing position.

In FIG. 4, the elements of a simulator, provided with an optical display according to the present example, are shown. A computer 101, programmed with the flight and aircraft data, computes the instantaneous position and attitude of the simulated aircraft. This data is used to control a visual image generation system. A terrain model 102 is viewed by a closed circuit television camera 103 through an optical probe system 104, having servo-controlled optical elements to alter the viewing direction, in roll ($\phi$), pitch ($\theta$), and yaw, or heading, ($\psi$). A suitable system providing servo control of optical elements is described in U.S. Pat. No. 3,076,271. The servo control of a probe itself, as in relation to a scale model such as indicated at 102, is described in U.S. Pat. No. 3,757,190.

The relevant signals, in the system of FIG. 4, are as follows:

$\theta_C$ = Computed aircraft pitch;
$\theta_H$ = Head pitch;
$\theta_D$ = Demanded pitch;
$\theta_A$ = Achieved pitch;
$\theta_E$ = Pitch error;
$\psi_C$ = Computed aircraft heading;
$\psi_H$ = Head yaw;
$\psi_D$ = Demanded heading/yaw;
$\psi_A$ = Achieved heading/yaw;
$\psi_E$ = Heading/yaw error;
$\phi_C$ = Computed aircraft roll;
$\phi_H$ = Head roll; and
$\phi_D$ = Demanded roll.

The signals from the computer are $\theta_C$, $\psi_C$, and $\phi_C$. To these are added $\theta_H$, $\psi_H$, and $\phi_H$, respectively, in adders 105, 106, 107, respectively. The signals from the potentiometers 51, 52, 53, 54, 55, and 56 FIG. 2, are shown at 111 leaving the flexible optical link 5 FIG. 4, and entering the axis transformation device 108, which produces $\theta_H$, $\psi_H$, and $\phi_H$. The six signals are electronically combined in the device 108, in accordance with equations derived from the geometry of the flexible optical link. As illustrated, axis transformation device 108 receives signals from a series of six potentiometers 51, 52, 53, 54, 55 and 56 (shown in FIG. 2) and converts these signals into head roll, head yaw and head pitch signals. The six signals from the potentiometers are electronically combined, as stated above, in accordance with equations derived from the geometry of the flexible optical link 5. The signal shown at 112 is also computed for feeding to the servo motor 41 to rotate the Dove prism 38 so that the displayed image format does not roll with respect to the cockpit when the pilot moves his head. Analogue or digital techniques may be used in the system of FIG. 4 in accordance with standard practice.

As described above, the pilot may move his head into any position and the servos in the camera optical system will select the required view. However, the angular position of the view exactly follows head movement, because the beams forming the two images are reflected from the beam splitter 45 mounted on the pilot's helmet 1, whereas the selection of the correct view from the terrain model requires the servos connected to the optical system to position themselves correctly.

For very quick head movements, these servos may not be able to follow fast enough, giving a momentary error in the position of the view on the screen as the pilot turns his head. To correct for this error, $\psi_A$ and $\theta_A$, available from the instantaneous positions of the potentiometers or other angular position sensing elements of the heading and pitch servos of the camera optical system are subtracted from $\psi_D$ and $\theta_D$, respectively, in subtraction circuits 109 and 110, respectively, to give correction signals $\psi_E$ and $\theta_E$. These signals may be used to provide momentary positional correction of the image by fast-acting electronic deflection of the scanning of the TV projector in the line scan and frame scan directions respectively. The result of this arrangement is that, when the pilot moves his head, even if he moves it fast, displayed objects do not change in bearing or elevation.

Many other embodiments of the invention are possible, particularly in the form taken by the flexible optical linkage. As one possible alternative, it may be preferred to use parallel link mechanisms, such that a platform can translate in three orthogonal directions without any rotation and to mount bearings on the platform allowing for head roll, yaw and pitch. Potentiometers attached to these bearings then give $\theta_H$, $\psi_H$ and $\phi_H$, directly. Much simpler schemes are possible if azimuth changes only are required in the view. In this case, the beam splitter 45, FIG. 2, may be constrained to move without any rotation except in azimuth and a single potentiometer may then be used to give $\psi_H$ directly.

In any one of the foregoing arrangements using a physical optical link, the physical effort, on the part of the pilot, of moving the component mechanical parts, may be entirely removed by using servo assisted motion.

In such a servo-assisted system, in accordance with known servo-motion technique, a first set of signals is derived defining the instantaneous position of the pilot's head. Each head-position signal, or appropriate derived signal, is compared with a joint-position signal derived from sensors connected to the physical optical link structure, to derive an error signal for each said joint. Each joint is moved by motor means in the sense to reduce the error signal to zero, whereby the elements of the structure are motor driven correspondingly to the pilot's head movements, with no effort by the pilot and consequently no fatigue.

Another alternative is to eliminate the physical optical link to the pilot's head and to mount suitable optics on his helmet capable of receiving and directing the two beams onto the beam splitter 45. The projector beam would then be in the form of a collimated beam large enough to allow head movement without loss of any part of the image and head motions would be detected by, for example, reflection of infra-red beams from small mirrors mounted on the helmet. This arrangement does not, however, allow the pilot to turn his head through such large angles as in the scheme shown in FIG. 2.

A further alternative which eliminates the physical optical link to the pilot's head, involves projecting the image beam, to optical elements carried by the helmet, along a fixed path relatively to the helmet. This arrangement requires the optical projector, or at least optical elements of the projector system, to be moved by servo-controlled motor means in accordance with movements of the pilot's head. Thus, for example, the projector is carried on an arcuate gantry, which is arcuate about a center positioned substantially at the base of the pilot's skull and is rotated about an axis coincident with that of the pilot's neck, so that the gantry is always positioned for and aft of the pilot's helmet as the pilot rotates his head. When the pilot's head is raised or lowered, the projector is moved backwards or forwards, respectively, around the arcuate gantry, correspondingly, by the servo-controlled motor means.

Various sources for the TV image can be used, including different types of cathode ray tube projector, oil film projectors of the Eidophor or General Electric type, shadow-mask color cathode ray tubes, with suitable optics and modulated, deflected laser beam projectors.

Depending on the type of image source, various forms of fast-acting positional correction can be used. Electronic correction, using deflection of the scanning as described above, may be inappropriate in specific instances and one or two galvanometer mirrors, deflected by the error signals, may be used to give momentary deflection of the light beam leaving the projector, as an alternative.

The embodiment of the invention particularly described above in confined to generation of the television signal by a television camera, viewing a scale model. The invention may, alternatively, be carried out using laser-beam generator and scanning apparatus for illuminating the scale model and light pick-up means for providing signals for a color image. As a further alternative the invention may be carried out using computer generated images. In such case, in FIG. 4, the CCTV camera 103, servo controlled optics 104, and terrain model 102 are replaced by a computer generated image generator, which produces the video signals for feeding to the display.

In this case, there are no servo systems to give a time delay, as with the servo controlled optics 104, and the subtraction circuits 109 and 110 and associated correction signals $\theta_E$ and $\psi_E$ are not used.

What we claim is:

1. Visual display apparatus, for providing a visual display before a trainee pilot of a moving craft, or like observer, comprising image generating apparatus and image projection apparatus for projecting an image generated by the image generating apparatus, the projection apparatus including a projection screen of highly retroflective material at least partly surrounding the pilot, a helmet or the like, to be worn on the pilot's head, an optical projector for projecting the said image as a light beam and movable optical means defining a movable optical path for the said light beam between the optical projector and the pilot's helmet, light reflective means, carried by the said helmet, for reflecting said image light beam forwardly onto the said projection screen from a position corresponding to the pilot's eyes, means for varying said generated image in accordance with the movement and attitude of the said craft, means for sensing movement in rotation and in inclination of the said helmet and providing control signals corresponding thereto and means, responsive to said control signals, for varying said generated image correspondingly to the orientation of said pilot's helmet.

2. Visual display apparatus as claimed in claim 1, in which the said movable optical path includes light beam splitting means for splitting said image light beam into left eye and right eye image beams and said light reflective means carried by the helmet reflects both said image beams forwardly from positions corresponding to the pilot's left eye and right eye, respectively.

3. Visual display apparatus as claimed in claim 2, in which the left and right eye image beam paths include light-polarizing means to polarize the two light beams in directions at right-angles.

4. Visual display apparatus as claimed in claim 1, in which the image projection apparatus includes a television image projection tube and the image generating apparatus includes a scale model at least of terrain overflown, by said craft, an optical probe including a lens for viewing the model and for providing an image for a closed-circuit television camera tube, means for moving the probe correspondingly to simulated craft movement, means for directing the viewing lens axis according to craft attitude and means for further directing the viewing lens axis responsive to the said control signals.

5. Visual display apparatus as claimed in claim 1, in which the said helmet, to be worn on the pilot's head, has attached thereto beam-splitting optical means providing both for said forward reflection of said image light beam and the transmission of light rearwardly therethrough, whereby the said pilot may view the displayed scene.

6. Visual display apparatus as claimed in claim 1, in which the said scene is a reproduced color television image.

7. Visual display apparatus as claimed in claim 1, in which said movable optical means, defining said movable optical path, extends between said image projection apparatus and said helmet and includes a hollow tube having a plurality of bends and intermediate straight portions, a reflecting optical element at each bend to reflect said image light beam along the straight portion next following and a plurality of joints rotatable about the axis of a tube straight portion and having electrical sensor means for providing an electrical signal corresponding to the extent of rotation of the joint.

8. Visual display apparatus as claimed in claim 7, in which the said movable optical path, defined by said movable optical means, includes an input lens forming a real image, said reflecting optical elements at said hollow tube bends, at least one relay lens, an eyepiece lens, beam-splitting optical means providing parallel image beams spaced apart by substantially the distance between left and right eyes of an observer and said reflective means, carried by the said helmet, for reflecting both said spaced apart image beams forwardly onto the said projection screen.

* * * * *